Z. D. GRAHAM.
RUBBER STAMP RACK.
APPLICATION FILED NOV. 18, 1908.
954,793.
Patented Apr. 12, 1910.
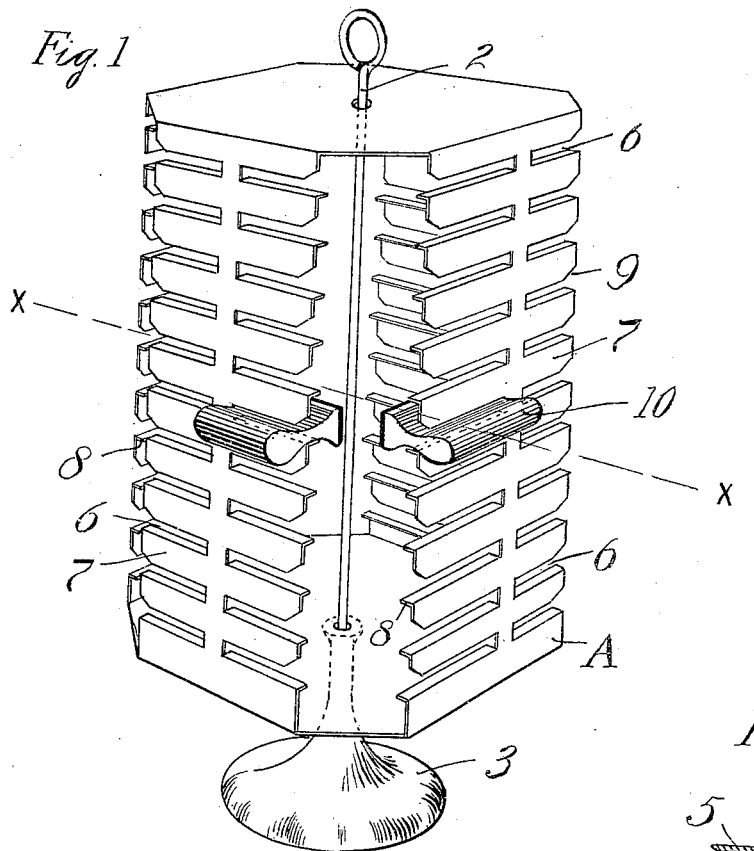
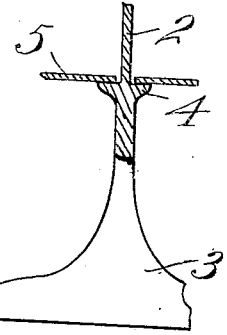
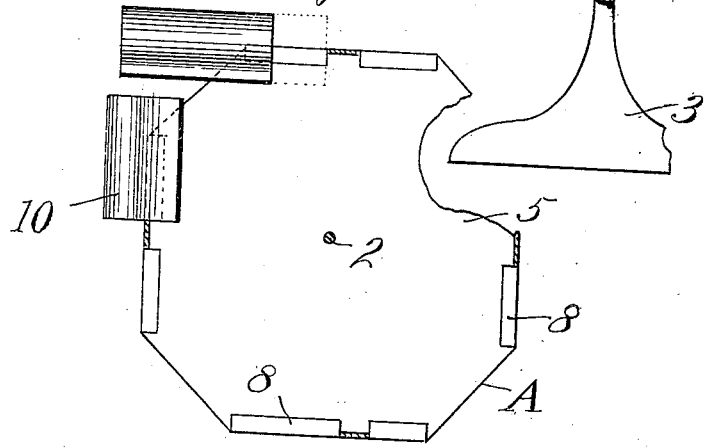
Witnesses,
George Voelker
Hattie Smith
Inventor,
Zachariah D. Graham
by Lothrop Johnson
Attorneys

UNITED STATES PATENT OFFICE.

ZACHARIAH D. GRAHAM, OF ST. PAUL, MINNESOTA.

RUBBER-STAMP RACK.

954,793. Specification of Letters Patent. Patented Apr. 12, 1910.

Application filed November 18, 1908. Serial No. 463,174.

*To all whom it may concern:*

Be it known that I, ZACHARIAH D. GRAHAM, a citizen of the United States, residing at St. Paul, in the county of Ramsey and State of Minnesota, have invented certain new and useful Improvements in Rubber-Stamp Racks, of which the following is a specification.

My invention relates to improvements in racks for holding hand stamps, its object being particularly to provide an improved construction of rack by which a plurality of hand stamps of varying sizes may be supported in easily accessible position for use, its object being further to so construct the rack as to provide for the carrying of designating or descriptive matter in connection with the different stamps.

To this end my invention consists in the features of construction and combination hereinafter particularly described and claimed.

In the accompanying drawings forming part of this specification, Figure 1 is a perspective view of my improved invention; Fig. 2 is a section on line $x$—$x$ of Fig. 1 partly broken away, and Fig. 3 is a detail of the supporting base for the rack shown partly in section.

As shown in the drawings the rack comprises a rectangular frame A of sheet metal rotatably supported upon a spindle 2 carried by a base 3. The base 3 is formed with a horizontal flange 4 upon which rests the bottom 5 of the skeleton frame A. Each side of the frame A is formed with two vertical rows of slots 6 open at their outer ends, the slots of each row being separated by relatively wider walls 7. The walls 7 are preferably formed with inturned flanges 8 constituting the lower sides of the slots 6 and also have cut-away portions 9 at the outer ends of the slots to facilitate the insertion and removal of the stamps 10. As shown in Fig. 1 I make certain rows of the slots longer than other rows so as to accommodate different lengths of stamps. In use the walls 7 between the stamp receiving slots may be inscribed with suitable designating matter indicating the stamp so as to render the use of the device more convenient. It thus is possible with the use of my device to have a particular opening for each stamp, while at the same time securing a device by which a large number of stamps may be supported and quickly and easily inserted and removed.

While I have in the drawings shown my invention embodied in a rectangular skeleton frame rotatably supported upon a spindle I may change the particular construction of the frame without departing from the principle of the invention, the scope of which is defined in the following claim.

I claim as my invention:

A rack for rubber stamps of that class in which the stamp has an elongated handle, said rack being formed with a plurality of superimposed relatively long openings proportioned to receive said stamp handles and walls separating said openings, said walls being wider than the openings and each being cut away at one end for the purpose set forth.

In testimony whereof I affix my signature in presence of two witnesses.

ZACHARIAH D. GRAHAM.

Witnesses:
H. S. JOHNSON,
HATTIE SMITH.